US008854709B1

United States Patent
Liu et al.

(10) Patent No.: US 8,854,709 B1
(45) Date of Patent: Oct. 7, 2014

(54) AUTOMATIC WHITE BALANCE BASED ON DYNAMIC MAPPING

(71) Applicant: OmniVision Technologies, Inc., Santa Clara, CA (US)

(72) Inventors: Chengming Liu, San Jose, CA (US); Changmeng Liu, San Jose, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 52 days.

(21) Appl. No.: 13/890,106

(22) Filed: May 8, 2013

(51) Int. Cl.
*H04N 1/46* (2006.01)
*H04N 9/73* (2006.01)
*H04N 1/407* (2006.01)

(52) U.S. Cl.
CPC .................. *H04N 9/73* (2013.01); *H04N 9/735* (2013.01); *H04N 1/407* (2013.01)
USPC ...... 358/516; 358/1.9; 348/223.1; 348/225.1; 348/226.1; 348/234; 348/370; 348/655; 382/162

(58) Field of Classification Search
None
See application file for complete search history.

(56) References Cited

U.S. PATENT DOCUMENTS

| 7,423,779 | B2 | 9/2008 | Shi | |
|---|---|---|---|---|
| 7,868,930 | B2 | 1/2011 | Shi | |
| 7,872,672 | B2 | 1/2011 | Shi | |
| 7,916,347 | B2 | 3/2011 | Shi | |
| 7,940,310 | B2 | 5/2011 | Shi | |
| 7,973,968 | B2 | 7/2011 | Shi | |
| 8,149,292 | B2 | 4/2012 | Xiong et al. | |
| 8,531,548 | B2 * | 9/2013 | Koishi | 348/223.1 |
| 2004/0095478 | A1 * | 5/2004 | Takano et al. | 348/223.1 |
| 2007/0058186 | A1 * | 3/2007 | Tanaka | 358/1.9 |
| 2007/0146498 | A1 * | 6/2007 | Kim et al. | 348/223.1 |
| 2007/0236715 | A1 * | 10/2007 | Hashimoto et al. | 358/1.9 |
| 2007/0285530 | A1 * | 12/2007 | Kim et al. | 348/223.1 |
| 2013/0057726 | A1 * | 3/2013 | Shimizu | 348/224.1 |

* cited by examiner

*Primary Examiner* — Miya J Cato
(74) *Attorney, Agent, or Firm* — Blakely Sokoloff Taylor & Zafman LLP (57) ABSTRACT

A method of white balancing an image includes mapping pixels of the image to a color space diagram. Each of the pixels of the image include a red ("R"), a green ("G"), and a blue ("B") subvalue. A first central tendency of each of the RGB subvalues of pixels mapped in a first pre-defined region of the color space diagram is determined and a second central tendency of each of the RGB subvalues of pixels mapped in a second pre-defined region of the color space diagram is determined. The first pre-defined region is associated with a first illuminating source and the second pre-defined region is associated with a second illuminating source. RGB values of a white pixel are generated based on the first and second central tendencies.

18 Claims, 7 Drawing Sheets

AUTOMATIC WHITE BALANCE BASED ON DYNAMIC MAPPING

BACKGROUND INFORMATION

1. Field of the Disclosure

The present invention relates generally to image correction, and more specifically relates to automatic white balancing.

2. Background

The visual system of the human eye is capable of adapting to changes in lighting conditions. For example, when a person is viewing an object that is indoors, the illuminant source may be a light bulb, while when a person is viewing an object that is outdoors, the illuminant source may be the sun. When a white object travels from sunlight (which has more blue color component) to incandescent light (which has more red color component), the human visual system makes adjustment to balance the red, green, and blue color components to ensure that a white object appears white in both daylight and incandescent light. The technique of balancing the red color, green color, and blue color components is known as white balance. Thus, the human visual system automatically white balances an image to preserve the true white color of a white object in the image even as the white object reflects light from different illuminant sources. Image capture systems use automatic white balance ("AWB") algorithms to attempt to mimic the human visual mechanism in order to reproduce the true white color of a white object in an image under different illuminant sources.

The strength of the RGB color components varies significantly in different light conditions. For example, there is far more blue color component in daylight, e.g., D65, than in interior cool white fluorescent ("CWF") light. Table I provides a color temperature index for different illuminant types. Higher color temperature, such as daylight, e.g., D65, has more blue color component while lower color temperature, such as incandescent light, e.g., A, has more red color component.

TABLE I

| Color Temperature Index | |
|---|---|
| Illuminant Type | Color Temperature |
| D65 (Daylight) | 6500K |
| CWF (Cool White Fluorescent) | 4500K |
| A (Incandescent Light) | 2000K |

AWB methodology includes analyzing a captured image to determine its illuminant source and then, derives the amount of gain adjustment necessary to achieve white balance. The AWB mechanism examines the pixels of an image to obtain information on the illuminant source of the image. It also determines the gain adjustments needed for white balancing the image. The white pixels of an image contain information used to ascertain the white balance setting.

Prior art AWB methods presume that the whole image is under a single illuminant type and needs to be white balanced for the single illuminant type. However, the assumption of single illuminant type often results in a less accurate AWB estimation, and furthermore it may result in images that are not pleasing to the eye because of seemingly unnatural coloring, especially when the image is taken by a smart-phone camera.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the detailed description provided below, numerous specific details are provided to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A conventional AWB method uses a color space diagram that contains two or more pre-defined white areas for different illuminant sources. A pre-defined white area characterizes the space occupied by the white pixels of a given illuminant source in a color space diagram. In other words, the pre-defined white area is the area in a color space diagram where all white pixels of a particular illuminant source can be found. Therefore, locating the pre-defined white area of a white pixel indicates the illuminant source associated with the pixel. A color space diagram with separate pre-defined white areas for different illuminant sources can serve as a template for ascertaining the illuminant source of white pixels. The AWB mechanism also relies on the color space diagram to select the white pixels of an image. The red-green-blue ("RGB") values of white pixels are used to decide whether there is a need for gain adjustments to the red, green, and blue signals to white balance an image.

In contrast to conventional AWB methods that presume an image is taken under a single illuminant source, embodiments of the disclosure allow for the possibility that the image is taken under a combination of several illuminant sources.

Process One: Correction Allowing for More than One Illuminant Source

Figure 1:
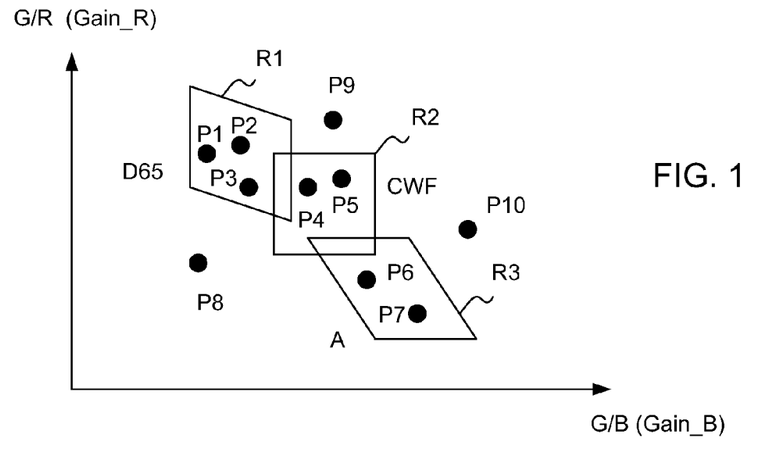
FIG. 1 shows three pre-defined white areas with mapped pixels in a color space diagram G/B-G/R, in accordance with the teachings of the disclosure.

FIG. 1 shows three pre-defined white areas, which are denoted as region R1, region R2, and region R3, that correspond to D65 (Daylight), CWF (Cold White Fluorescent), and A (Incandescent) illuminant types, respectively, in accordance with the teachings of the disclosure. Regions R1, R2, and R3 are situated in a color space diagram G/B-G/R. G/B is the gain of B signal relative to G signal (Gain_B), and G/R is the gain of R signal relative to G signal (Gain_R) for white balance. After an image is captured by an image sensor, each pixel of the image (e.g., P1-P10) is mapped to color space diagram G/B-G/R as shown in FIG. 1. Each of the pixels in the captured image includes a red, a green, and a blue ("RGB") subvalue. Only pixels in regions R1 (e.g., P1, P2, P3), region R2 (e.g., P4, P5), and region R3 (e.g., P6, P7) are taken into account, and pixels outside regions R1, R2, and R3 (e.g., P8, P9, P10) are neglected.

In conventional methods, the region having the largest number of pixels is selected. For example, if region R1 had the largest number of pixels (e.g., three pixels), it would be assumed that the whole image was under D65 illumination. Then, the white pixel would be positioned at a point associated with the mean RGB value of the pixels in region R1 only. Similarly, if R2 had the largest number of pixels, it would be assumed that the whole image was under CWF illumination. If R3 had the largest number of pixels, it would be assumed that the whole image is under A illumination.

In contrast to conventional methods, in one embodiment of the disclosure, it is assumed that the whole image is under a combination of different illuminant types, for example, a combination of D65, CWF, and A. In one embodiment of the disclosure, the mean R, G, and B subvalues of pixels in region R1 (e.g., P1, P2, P3) are calculated, which are R_D65, G_D65, and B_D65. Similarly, the mean R, G, and B subvalues of pixels in region R2 (e.g., P4, P5) are calculated, which are R_CWF, G_CWF, and B_CWF, and the mean R, G, and B subvalues of pixels in region R3 (e.g., P6, P7) are calculated, which are R_A, G_A, and B_A. It is appreciated that in other embodiment other central tendencies (e.g. median) may be used in place of an arithmetic mean calculation.

Weighted factors for regions R1, R2, and R3 may be assigned using a pre-defined weighting factor or based on some condition. The weighted factors are W_D65, W_CWF, and W_A, which correspond to R1, R2, and R3, respectively. In one example, W_D65 may be greater than W_CWF, which may be greater than W_A if the camera is mostly used for taking pictures in the daylight setting.

The mean RGB values of the resulting white pixel can be calculated as follows.

$$\text{Mean\_}R=(R\_D65*W\_D65+R\_CWF*W\_CWF+R\_A*W\_A)/(W\_D65+W\_CWF+W\_A)$$

$$\text{Mean\_}G=(G\_D65*W\_D65+G\_CWF*W\_CWF+G\_A*W\_A)/(W\_D65+W\_CWF+W\_A)$$

$$\text{Mean\_}B=(B\_D65*W\_D65+B\_CWF*W\_CWF+B\_A*W\_A)/(W\_D65+W\_CWF+W\_A) \quad \text{Equations (1)}$$

Figure 2:
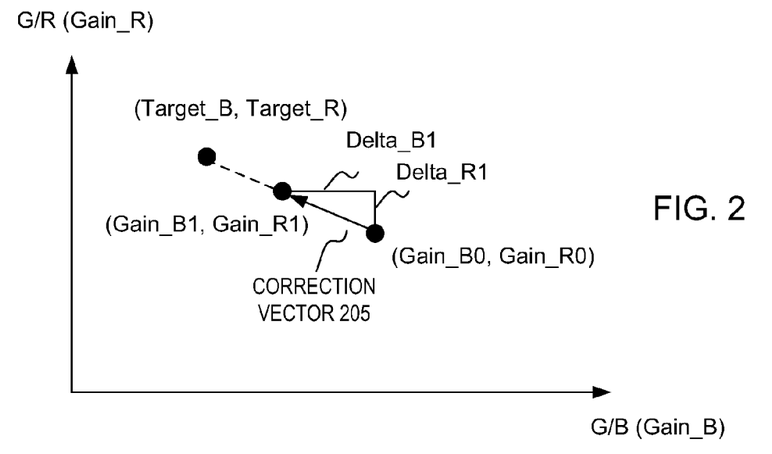
FIG. 2 shows that the white pixel is moved from the point (Gain_B0, Gain_R0) to the point (Gain_B1, Gain_R1), in accordance with the teachings of the disclosure.

The resulting white pixel is located in color space diagram G/B-G/R at (Gain_B0, Gain_R0) as shown in FIG. 2, in accordance with the teachings of the disclosure, where $$\text{Gain\_}B0=\text{Mean\_}G/\text{Mean\_}B$$

$$\text{Gain\_}R0=\text{Mean\_}G/\text{Mean\_}R \quad \text{Equations (2)}$$

This defines the position of a corrected white pixel in color space diagram that corrects for the combination of several illuminant sources. After the white pixel is mapped to the color space diagram, further corrections can be applied.

Process Two: Correction for Brightness

Process two can provide additional correction to the white pixel. After finding the white pixel at point (Gain_B0, Gain_R0) in the color space diagram in process one, the white pixel may be moved from the point (Gain_B0, Gain_R0) to the point (Gain_B1, Gain_R1) in process two, where $$\text{Gain\_}B1=\text{Gain\_}B0+\text{Delta\_}B1$$

$$\text{Gain\_}R1=\text{Gain\_}R0+\text{Delta\_}R1 \quad \text{Equations (3)}$$

as shown in FIG. 2 in accordance with the teachings of the disclosure.

In process two, a target (Target_B, Target_R) may be pre-defined or defined based on some conditions. FIG. 2 shows that a correction vector 205 can be applied to the white pixel and that correction vector 205 is in the direction of the target. Correction vector 205 includes the Delta_B1 component and the Delta_B2 component shown in FIG. 2. To make the image look more pleasing to the eye, the target may be selected in region R1 associated with D65 illuminant source, which may generate a "warmer" image color. Of course, other targets may be selected.

Delta_B1 and Delta_R1 can be calculated as follows.

$$\text{Delta\_}B1=(\text{Target\_}B-\text{Gain\_}B0)*\text{Ratio}$$

$$\text{Delta\_}R1=(\text{Target\_}R-\text{Gain\_}R0)*\text{Ratio} \quad \text{Equations (4)}$$

Figure 3:
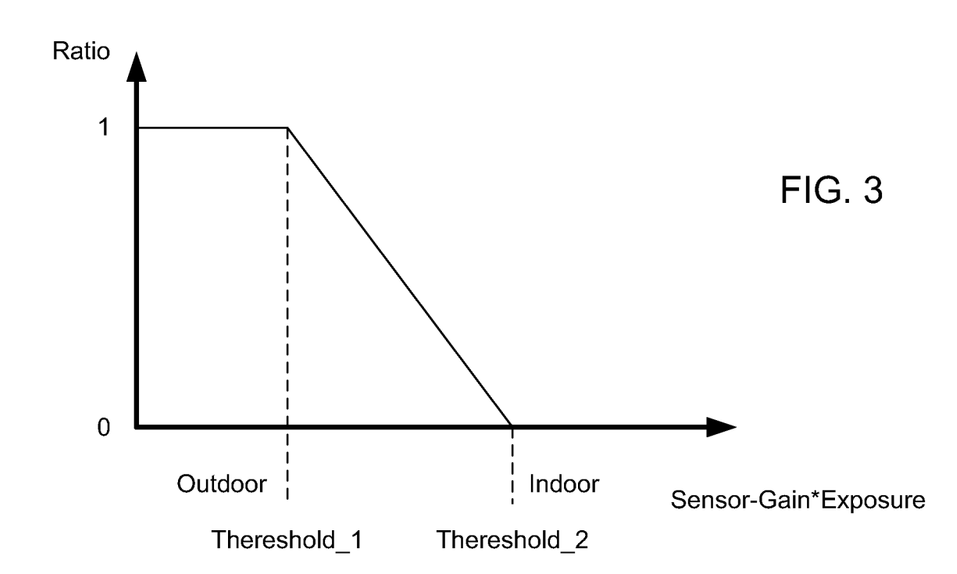
FIG. 3 shows a plot of (Sensor-Gain*Exposure) versus Ratio, in accordance with the teachings of the disclosure.

For a target in region R1 associated with D65 illuminant source, for example, Ratio can be determined by referring to FIG. 3 which is a plot of (Sensor-Gain*Exposure) versus Ratio. The value of (Sensor-Gain*Exposure) is constant for all R, G, and B pixels across the image taken. It is a global control of the image sensor, and not individually applied to R, G, and B pixels. In FIG. 3, Threshold_1 and Threshold_2 may be pre-defined or may be defined based on some conditions. If the picture is taken with a low value of (Sensor-Gain*Exposure), the picture may have been taken in an outdoor setting. Thus, Threshold_1 is selected such that the region to the left of Threshold_1 is associated with outdoor setting and Ratio=1. On the other hand, if the picture is taken with high value of (Sensor-Gain*Exposure), the picture may have been taken in an indoor setting. Thus, Threshold_2 is selected such that the region to the right of Threshold_2 is associated with indoor setting and Ratio=0. Between Threshold_1 and Threshold_2, Ratio is between 1 and 0.

Based on the reading of the value of (Sensor-Gain*Exposure) when a picture is taken, Ratio for the picture can be determined from FIG. 3. If Ratio is one, the white pixel at (Gain_B0, Gain_R0) is moved toward the target at (Target_B, Target_R). If Ratio is zero, the white pixel at (Gain_B0, Gain_R0) is not moved. If 0<Ratio<1, the white pixel at (Gain_B0, Gain_R0) is moved to the point (Gain_B1, Gain_R1) in color space diagram G/B-G/R as shown in FIG. 2. In other words, the "magnitude" of correction vector 205 corresponds to Ratio and the direction of correction vector 205 is defined by the target. Therefore, applying correction vector 205 corrects the position of the white pixel in the color space diagram due to the brightness. The magnitude of correction vector 205 may be defined by a user of a camera.

Process Three: Correction for Color Temperature

Figure 4:
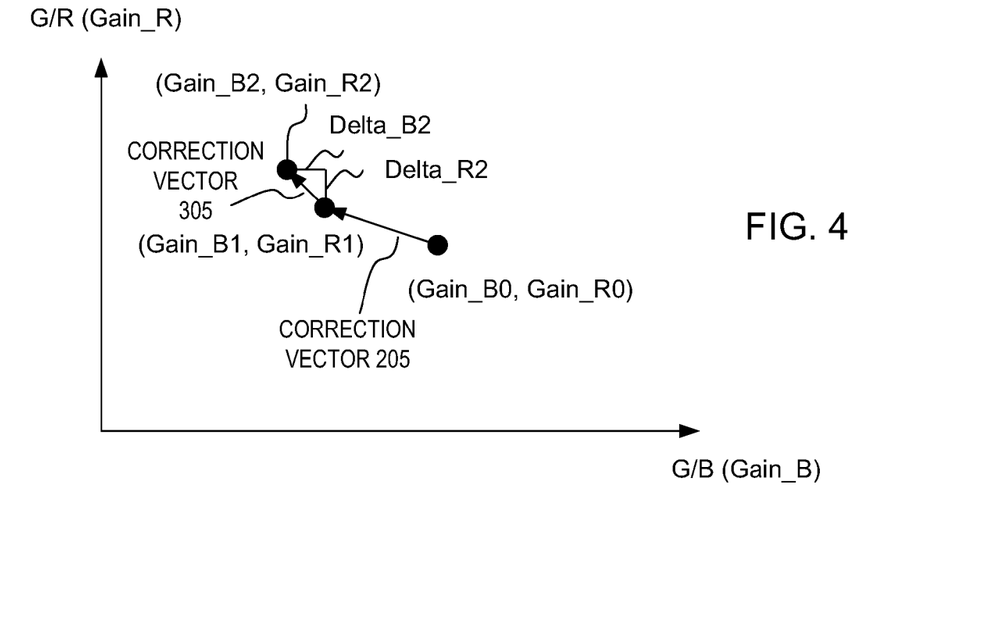
FIG. 4 shows that the white pixel is further moved from the point (Gain_B1, Gain_R1) to the point (Gain_B2, Gain_R2), in accordance with the teachings of the disclosure.

After correcting the white pixel by shifting it via correction vector 205 to Gain_B1, Gain_R1 in the color space diagram in process two, the white pixel may be further shifted. FIG. 4 shows that the white pixel may be moved from Gain_B1, Gain_R1 to the point Gain_B2, Gain_R2 in process three where $$Gain\_B2 = Gain\_B1 + Delta\_B2$$

$$Gain\_R2 = Gain\_R1 + Delta\_R2 \quad \text{Equations (5)}$$

Figure 5:
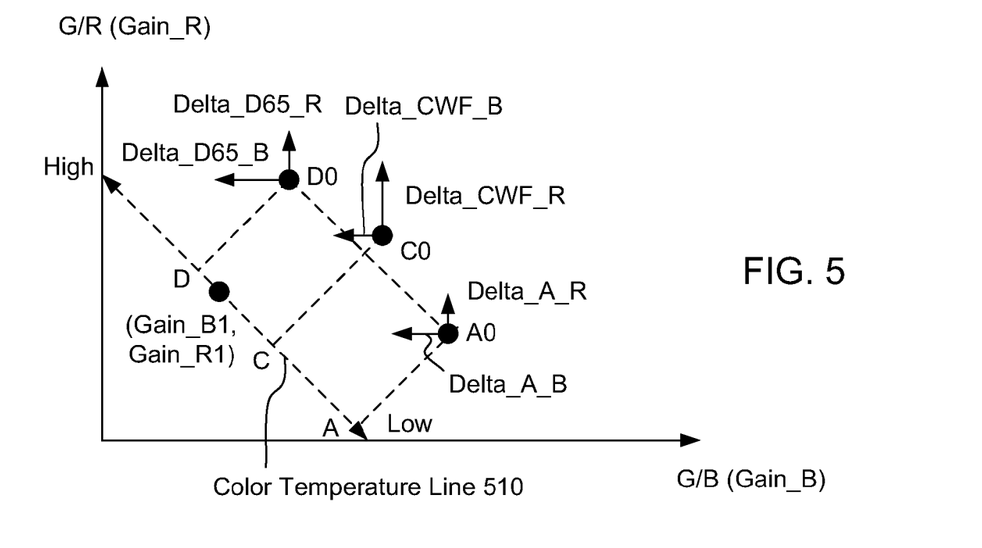
FIG. 5 shows a temperature line through the white pixel in a color space diagram, in accordance with the teachings of the disclosure.

In process three, at least two control points are pre-defined or defined based on some conditions. For example, three control points D0, C0, and A0 in regions R1, R2, and R3, respectively, are shown in FIG. 5, in accordance with the teachings of the disclosure. The shifts in the Gain_B direction and the Gain_R direction of each control point may be pre-defined or defined based on conditions. In one embodiment, the shifts are toward the high color temperature. The control point D0 has a shift in the Gain_B direction, which is Delta_D65_B, and a shift in the Gain_R direction, which is Delta_D65_R. The control point C0 has a shift in the Gain_B direction, which is Delta_CWF_B, and a shift in the Gain_R direction, which is Delta_CWF_R. The control point A0 has a shift in the Gain_B direction, which is Delta_A_B, and a shift in the Gain_R direction, which is Delta_A_R. The shifts in the respective directions may be associated with a user defined setting to adjust the image according to the user's preference.

A color temperature line is drawn through the white pixel at point (Gain_B1, Gain_R1), which is parallel to the line passing through at least two control points. In one embodiment, color temperature line 510 is parallel to the line passing through control points D0 and A0, as shown in FIG. 5. The end at the side of point A0 is low color temperature (Incandescent Light=2000K), and the end at the side of point D0 is high color temperature (Daylight=6500K). Points D0, C0, and A0 are projected on the color temperature line at point D, C, and A, respectively.

Figure 6:
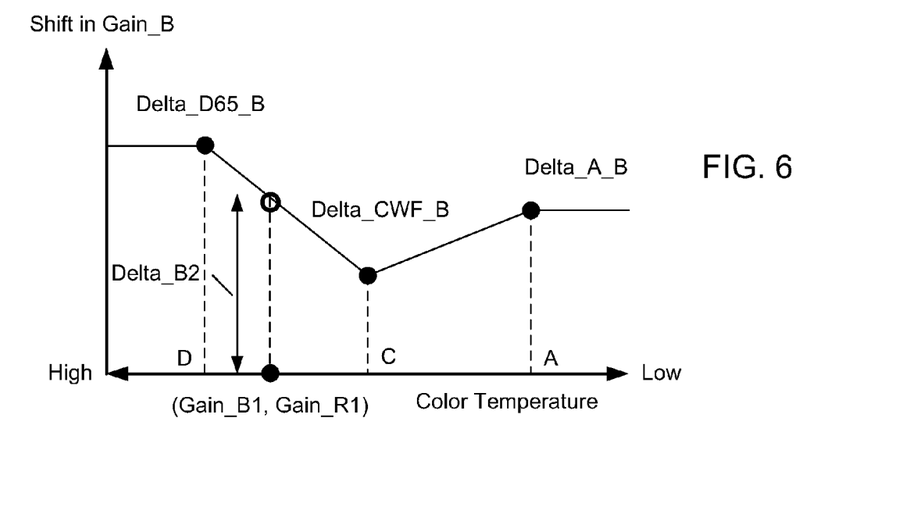
FIG. 6 shows a chart having the color temperature line as the abscissa and the shift in the Gain_B direction as the ordinate, in accordance with the teachings of the disclosure.

The color temperature line is the abscissa of the coordinate and the ordinate is the shift in the Gain_B direction, in FIG. 6, in accordance with the teachings of the disclosure. If the point (Gain_B1, Gain_R1) is between D and C on the color temperature, the shift of the white pixel at point (Gain_B1, Gain_R1) in the Gain_B direction, which is Delta_B2, is the interpolation between the value of D, which is Delta_D65_B, and the value of C, which is Delta_CWF_B. On the other hand, if the point (Gain_B1, Gain_R1) is between C and A on the color temperature, the shift of the white pixel at point (Gain_B1, Gain_R1) in the Gain_B direction, which is Delta_B2, is the interpolation between the value of C, which is Delta_CWF_B, and the value of A, which is Delta_A_B.

If the point (Gain_B1, Gain_R1) has color temperature higher than point D, the shift of the white pixel at point (Gain_B1, Gain_R1) in Gain_B direction will be the same as the value of D, which is Delta_D65_B and which is an extrapolation beyond point D. If the point (Gain_B1, Gain_R1) has color temperature lower than point A, the shift of the white pixel at point (Gain_B1, Gain_R1) in Gain_B direction will be the same as the value of A, which is Delta_A_B and which is an extrapolation beyond point A.

Figure 7:
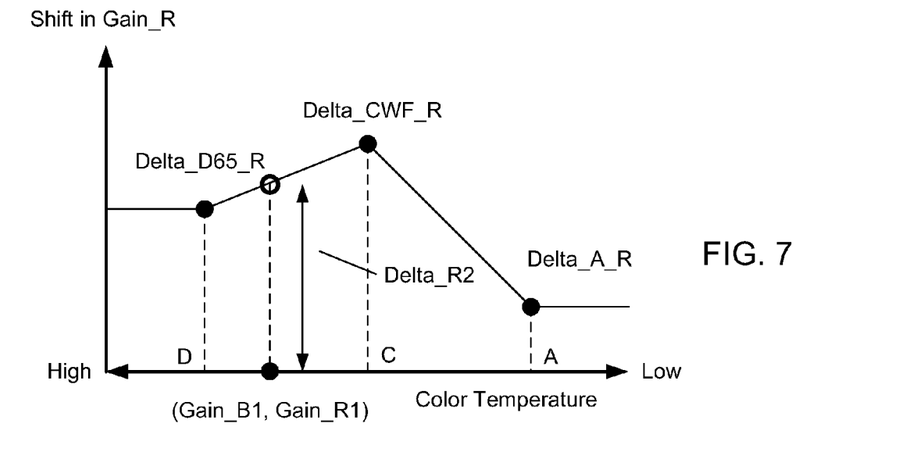
FIG. 7 shows a chart having the color temperature line as the abscissa and the shift in the Gain_R direction as the ordinate, in accordance with the teachings of the disclosure.

Similarly, the color temperature line is the abscissa and the shift in the Gain_R direction is the ordinate in the coordinate in FIG. 7, in accordance with the teachings of the disclosure. If the point (Gain_B1, Gain_R1) is between D and C on the color temperature, the shift of the white pixel at point (Gain_B1, Gain_R1) in Gain_R direction, which is Delta_R2, is the interpolation between the value of D, which is Delta_D65_R, and the value of C, which is Delta_CWF_R. On the other hand, if the point (Gain_B1, Gain_R1) is between C and A on the color temperature, the shift of the white pixel at point (Gain_B1, Gain_R1) in Gain_R direction, which is Delta_R2, is the interpolation between the value of C, which is Delta_CWF_R, and the value of A, which is Delta_A_R.

If the point (Gain_B1, Gain_R1) has color temperature higher than point D, the shift of the white pixel at point (Gain_B1, Gain_R1) in Gain_R direction will be the same as the value of D, which is Delta_D65_R and which is an extrapolation beyond point D. If the point (Gain_B1, Gain_R1) has color temperature lower than point A, the shift of white pixel at point (Gain_B1, Gain_R1) in Gain_R direction will be the same as the value of A, which is Delta_A_R and which is an extrapolation beyond point A.

This corrects the position of a white pixel in color space diagram due to color temperature.

In one embodiment, process three may directly follow process one. In this case, the final position of the white pixel (Gain_B2, Gain_R2) is defined by $$Gain\_B2 = Gain\_B0 + Delta\_B2$$

$$Gain\_R2 = Gain\_R0 + Delta\_R2 \quad \text{Equations (6)}$$

And white pixel at (Gain_B0, Gain_R0) replaces white pixel at (Gain_B1, Gain_R1) in process three described above.

The final position of the white pixel (Gain_B2, Gain_R2) determines the gains of the AWB, which are Gain_B2 for blue signal, and Gain_R2 for red signal, while green signal is used as a reference. The gains (including correction vector(s) 205 and/or 305) of the AWB will then be applied to the pixels of the captured image to correct the image.

As described above, process one corrects the position of the white pixel in the color space diagram due to the combination of several illuminant sources, process two corrects the position of white pixel in color space diagram due to brightness, and process three corrects the position of white pixel in color space diagram due to color temperature. The final position of the white pixel (Gain_B2, Gain_R2) in color space diagram determines gains for B and R signals relative to G signal for white balance. In one embodiment, only process one is used. In one embodiment, process one and process two are used. In one embodiment, process one and process three are used. In one embodiment, all process one, process two, and process three are used.

Figure 8:
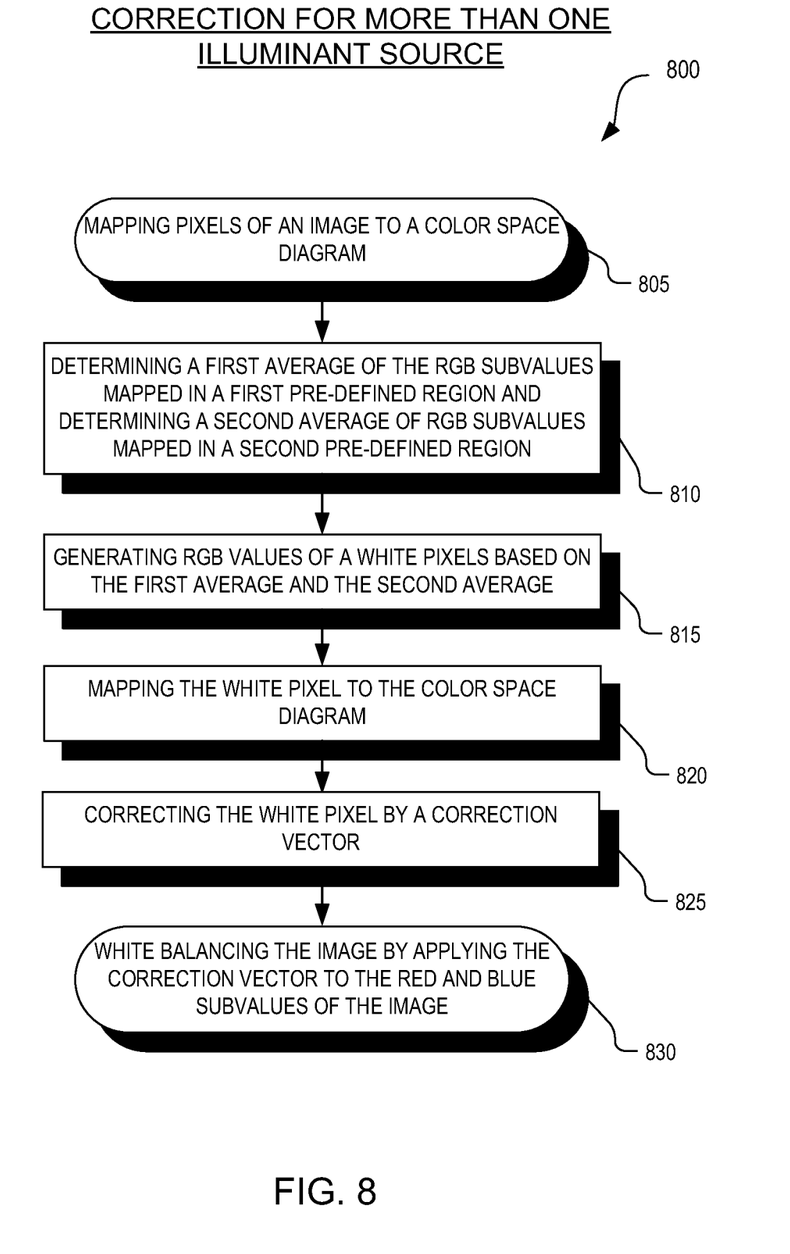
FIG. 8 shows a flowchart illustrating a process for white balancing that accounts for more than one illuminant source, in accordance with the teachings of the disclosure.

FIG. 8 shows a flowchart illustrating a process 800 for white balancing that accounts for more than one illuminant source, in accordance with the teachings of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In process block 805, pixels of an image are mapped to a color space diagram. The image may have been recently captured from a digital image sensor and/or stored in a memory. In process block 810, a first central tendency (e.g. average) of each of the RGB subvalues of pixels mapped in a first pre-defined region (e.g. R1) of the color space diagram is calculated. The first pre-defined region is associated with an illuminant source (e.g. D65). Also in process block 810, a second central tendency (e.g. average) of each of the RGB subvalues of pixels mapped in a second pre-defined region (e.g. R2) of the color space diagram is calculated. The second pre-defined region is also associated with an illuminant source (e.g. CWF). Although not shown in FIG. 8, a third central tendency (e.g. average) of each of the RGB subvalues of pixels mapped in a third pre-defined region (e.g. R3) of the color space diagram may also be calculated. The third pre-defined region may be associated with an illuminant source (e.g. A).

RGB values of a white pixel are generated based on the first and second central tendencies in process block 815. If a third central tendency associated with a third pre-defined region was calculated in process block 810, the RGB values of the white pixel are generated based on the first, second, and third central tendencies. In process block 820, the white pixel is mapped to the color space diagram. The white pixel is then corrected by a correction vector (e.g. correction vector 205 and/or 305) in process block 825. In other words, process two and/or three (described above) can be used to correct the white pixel generated in process block 815. In process block 830, the image is white balanced by applying the correction vector to the red and blue subvalues of the image, while the green subvalue is used as a reference.

Figure 9:
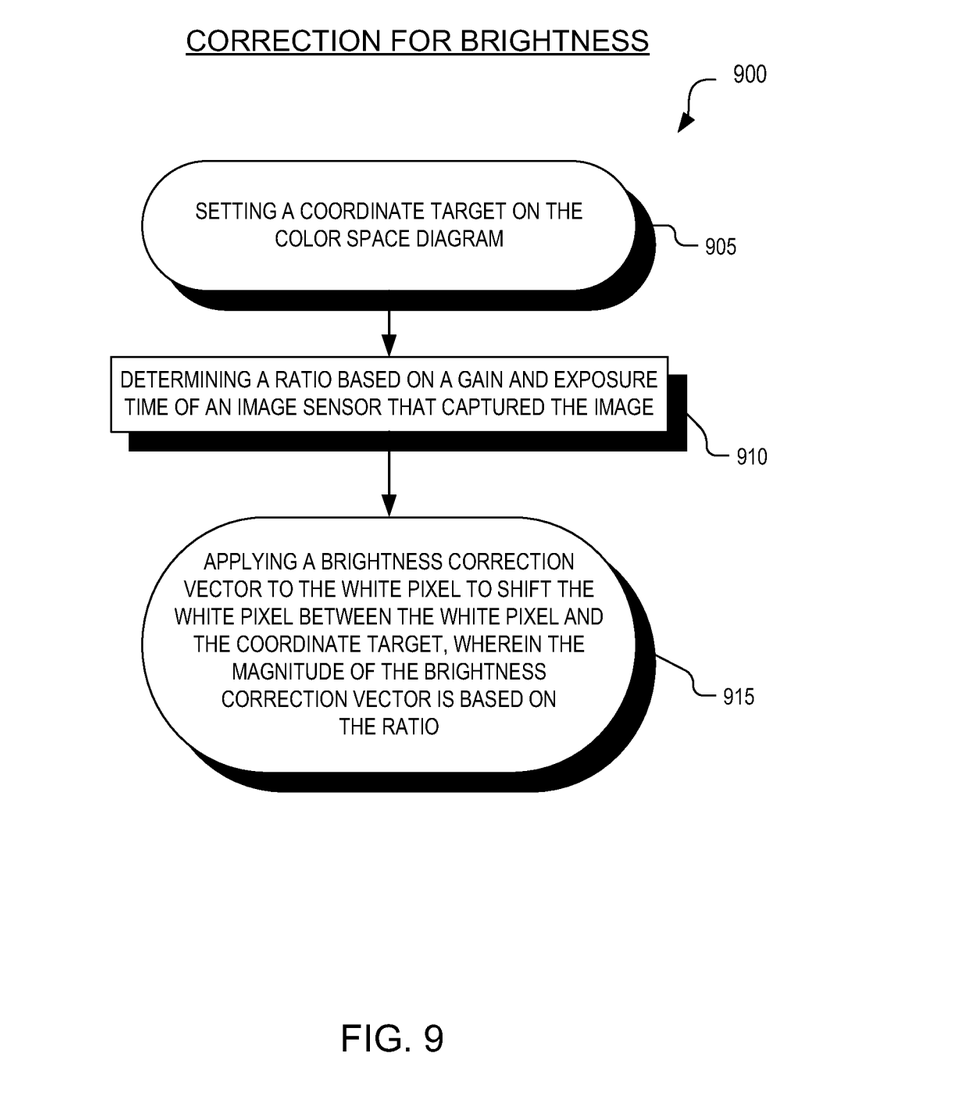
FIG. 9 shows a flowchart illustrating a process that corrects for image brightness, in accordance with the teachings of the disclosure.

FIG. 9 shows a flowchart illustrating a process 900 that corrects for image brightness, in accordance with the teachings of the disclosure. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

In process block 905, a coordinate target is set on the color space diagram. The coordinate target may be in a "warm" region of a color space diagram. The coordinate target may be set by a user of a camera. In process block 910, a Ratio is determined based on a gain of an image sensor or an exposure time (a.k.a. integration period) of an image sensor. In one embodiment, Ratio is based on a combination of gain and exposure time, as shown in FIG. 3. In process block 915, a brightness correction vector (e.g. correction vector 205) is applied to the white pixel. The brightness correction vector shifts the coordinates of the white pixel between the current coordinates of the white pixel and the target coordinate. The magnitude of the brightness correction vector corresponds to the Ratio. Once known, the brightness correction vector may be applied to every pixel in the image.

Figure 10:
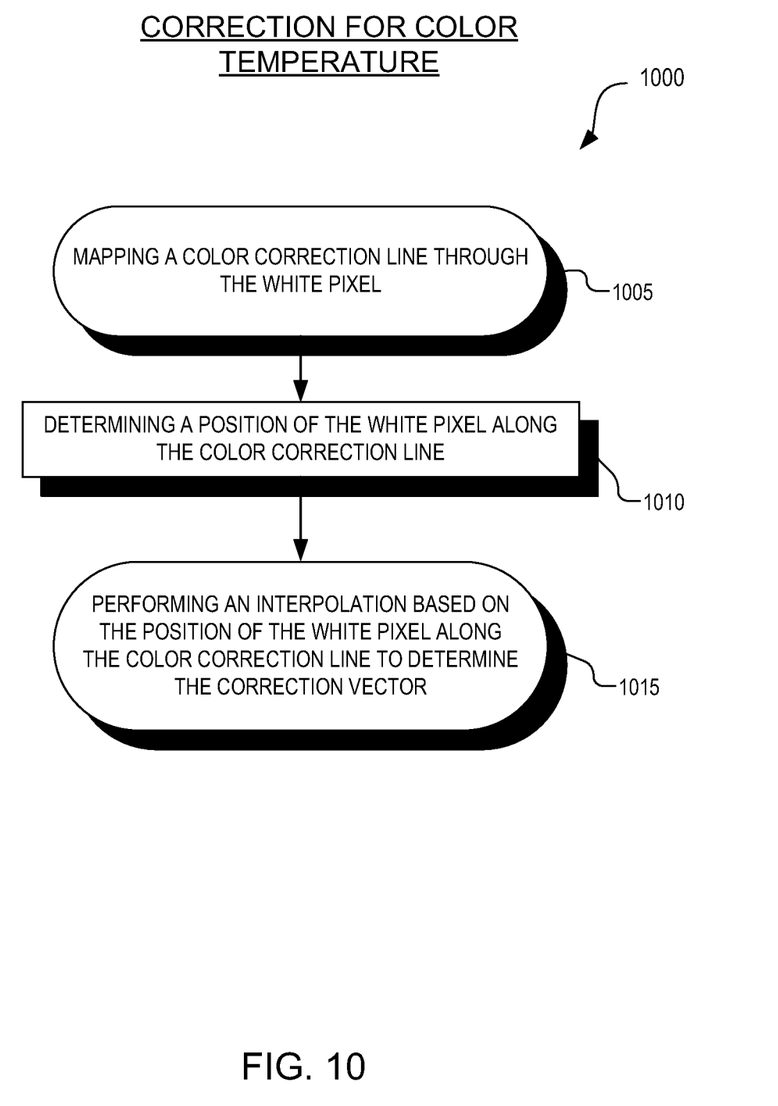
FIG. 10 shows a flowchart illustrating a process that corrects for color temperature, in accordance with the teachings of the disclosure.

FIG. 10 shows a flowchart illustrating a process 1000 that corrects for color temperature, in accordance with the teachings of the disclosure. The order in which some or all of the process blocks appear in process 1000 should not be deemed limiting. Rather, one of ordinary skill in the art having the benefit of the present disclosure will understand that some of the process blocks may be executed in a variety of orders not illustrated, or even in parallel.

In process block 1005, a color correction line (e.g. color correction line 510) is mapped through the white pixel. The color correction line may be parallel to two control points (e.g. A0 and D0). The position of the white pixel along the color correction line is determined in process block 1010. An interpolation based on the position of the white pixel along the color correction line is performed to determine the color temperature correction vector in process block 1015. In one embodiment, the interpolation is according to FIGS. 6 and 7, where one component of the color temperature correction vector is determined by FIG. 6 and another component of the color temperature correction vector is determined by FIG. 7.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of white balancing an image comprising:
    mapping pixels of the image to a color space diagram, wherein each of the pixels include a red ("R"), a green ("G"), and a blue ("B") subvalue;
    determining first central tendencies of each of the RGB subvalues of the pixels mapped in a first pre-defined region of the color space diagram and determining second central tendencies of each of the RGB subvalues of the pixels mapped in a second pre-defined region of the color space diagram, wherein the first pre-defined region is associated with a first illuminating source and the second pre-defined region is associated with a second illuminating source;
    applying a first weighting factor to each of the first central tendencies and applying a second weighting factor to each of the second central tendencies;
    generating mean RGB values of a white pixel based on the first central tendencies with the first weighting factor applied and the second central tendencies with the second weighting factor applied;
    mapping the white pixel to the color space diagram;
    correcting the white pixel by a correction vector on the color space diagram; and
    white balancing the image by applying the correction vector to the red and blue subvalues of the image.

2. The method of claim 1, wherein the correction vector includes a brightness correction vector to correct for brightness of the image.

3. The method of claim 2, wherein a length of the brightness correction vector is based on a gain of an image sensor that captured the image.

4. The method of claim 2, wherein a magnitude of the correction vector is based on an exposure time of image sensor pixels of the image sensor.

5. The method of claim 2, wherein a direction of the correction vector is based on a target coordinate associated with the first illuminating source.

6. The method of claim 1 further comprising:
determining third central tendencies of each of the RGB subvalues of the pixels mapped in a third pre-defined region of the color space diagram, wherein the third pre-defined region is associated with a third illuminating source, wherein said generating mean RGB values of the white pixel is also based on the third central tendencies.

7. The method of claim 1 further comprising:
setting a coordinate target on the color space diagram;
determining a ratio based on at least one of a gain of an image sensor that captured the image and an exposure time of the image sensor that captured the image; and
generating a brightness correction vector to shift the white pixel between the white pixel and the coordinate target, wherein a magnitude of the brightness correction vector is based on the ratio, and wherein the correction vector includes the brightness correction vector.

8. The method of claim 1, wherein the correction vector is determined at least partially to correct for color temperature of the image.

9. The method of claim 8, wherein determining the correction vector includes:
mapping a color correction line through the white pixel, wherein the color correction line is parallel to a pre-defined color correction line;
determining a position of the white pixel along the color correction line; and
performing an interpolation based on the position of the white pixel along the color correction line to determine the correction vector.

10. The method of claim 1, wherein the correction vector is determined to correct for brightness of the image and to correct for color temperature of the image.

11. The method of claim 1, wherein the first predefine region and the second pre-defined region overlap.

12. A non-transitory machine-accessible storage medium that provides instructions that, when executed by a machine, will cause the machine to perform operations comprising:
mapping pixels of the image to a color space diagram, wherein each of the pixels include a red ("R"), a green ("G"), and a blue ("B") subvalue;
determining first central tendencies of each of the RGB subvalues of the pixels mapped in a first pre-defined region of the color space diagram and determining second central tendencies of each of the RGB subvalues of the pixels mapped in a second pre-defined region of the color space diagram, wherein the first pre-defined region is associated with a first illuminating source and the second pre-defined region is associated with a second illuminating source;
applying a first weighting factor to each of the first central tendencies and applying a second weighting factor to each of the second central tendencies;
generating mean RGB values of a white pixel based on the first central tendencies with the first weighting factor applied and the second central tendencies with the second weighting factor applied;
mapping the white pixel to the color space diagram;
correcting the white pixel by a correction vector on the color space diagram; and
white balancing the image by applying the correction vector to the red and blue subvalues of the image.

13. The non-transitory machine-accessible storage medium of claim 12, further providing instructions that, when executed by the machine, will cause the machine to perform further operations, comprising:
determining third central tendencies of each of the RGB subvalues of the pixels mapped in a third pre-defined region of the color space diagram, wherein the third pre-defined region is associated with a third illuminating source, wherein said generating mean RGB values of the white pixel is also based on the third central tendencies.

14. The non-transitory machine-accessible storage medium of claim 12, further providing instructions that, when executed by the machine, will cause the machine to perform further operations, comprising:
setting a coordinate target on the color space diagram;
determining a ratio based on at least one of a gain of an image sensor that captured the image and an exposure time of the image sensor that captured the image; and
generating a brightness correction vector to shift the white pixel between the white pixel and the coordinate target, wherein a magnitude of the brightness correction vector is based on the ratio, and wherein the correction vector includes the brightness correction vector.

15. The non-transitory machine-accessible storage medium of claim 12, wherein the correction vector is determined at least partially to correct for color temperature of the image.

16. The non-transitory machine-accessible storage medium of claim 15, wherein determining the correction vector includes:
mapping a color correction line through the white pixel, wherein the color correction line is parallel to a pre-defined color correction line;
determining a position of the white pixel along the color correction line; and
performing an interpolation based on the position of the white pixel along the color correction line to determine the correction vector.

17. The non-transitory machine-accessible storage medium of claim 12, wherein the correction vector is determined to correct for brightness of the image and to correct for color temperature of the image.

18. The non-transitory machine-accessible storage medium of claim 12, wherein the first predefine region and the second pre-defined region overlap.

* * * * *